US007562377B2

(12) United States Patent
Allison et al.

(10) Patent No.: US 7,562,377 B2
(45) Date of Patent: *Jul. 14, 2009

(54) INTERACTIVE PROGRAM GUIDE NAVIGATOR MENU SYSTEM

(75) Inventors: Donald W Allison, Tulsa, OK (US); Steven C Williamson, Broken Arrow, OK (US); Walter B Herrington, Tulsa, OK (US)

(73) Assignee: United Video Properties, Inc., Los Angeles, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 10/914,970

(22) Filed: Aug. 9, 2004

(65) Prior Publication Data

US 2005/0144638 A1    Jun. 30, 2005

Related U.S. Application Data

(63) Continuation of application No. 09/573,482, filed on May 16, 2000, now abandoned, which is a continuation of application No. 08/889,526, filed on Jul. 8, 1997, now Pat. No. 6,262,722.

(51) Int. Cl.
*H04N 5/445* (2006.01)
(52) U.S. Cl. ............................. 725/45; 725/40; 725/44
(58) Field of Classification Search ........................ None
See application file for complete search history.

(56) References Cited

U.S. PATENT DOCUMENTS 5,353,121 A * 10/1994 Young et al. ............... 725/52
5,523,796 A    6/1996 Marshall et al.
5,585,866 A    12/1996 Miller et al.

(Continued)

FOREIGN PATENT DOCUMENTS

WO    WO 95/32587 A    11/1995

(Continued)

OTHER PUBLICATIONS

"VideoGuide User's Manual," VideoGuide Inc., 1995, p. 13.

(Continued)

*Primary Examiner*—John W Miller
*Assistant Examiner*—Chenea P Smith
(74) *Attorney, Agent, or Firm*—Ropes & Gray LLP

(57) ABSTRACT

An interactive program guide system is provided. The program guide system has a logically flat navigator menu structure made up of program guide categories and selectable program guide options. Program guide categories correspond to fairly broad groups of program guide features. Selectable program guide options correspond to more specific program guide features. Each program guide category has associated selectable program guide options. Program guide categories may be displayed in a row across the top of the display screen. Selectable program guide options may be displayed in the same column as the program guide category with which they are associated. A highlight region may be positioned on one of the selectable program guide options. The selectable program guide options may be scrolled using a pair of vertical cursors. Pressing a horizontal cursor while the highlight region is on one of the selectable program guide options causes a new program guide category and associated column of selectable program guide options to be displayed in place of the originally displayed program guide category and associated selectable program guide options.

22 Claims, 8 Drawing Sheets

U.S. PATENT DOCUMENTS

| | | | |
|---|---|---|---|
| 5,589,892 | A | 12/1996 | Knee et al. |
| 5,623,613 | A | 4/1997 | Rowe et al. |
| 5,629,733 | A | 5/1997 | Youman et al. |
| 5,686,954 | A | 11/1997 | Yoshinobu et al. |
| 5,737,029 | A * | 4/1998 | Ohkura et al. ............... 725/56 |
| 5,781,246 | A | 7/1998 | Alten et al. |
| 5,822,123 | A | 10/1998 | Davis et al. |
| 5,850,218 | A | 12/1998 | LaJoie et al. |
| 6,122,011 | A | 9/2000 | Dias et al. |
| 6,147,714 | A | 11/2000 | Terasawa et al. |
| 6,173,422 | B1 * | 1/2001 | Kimura et al. ............... 714/57 |
| 6,262,722 | B1 | 7/2001 | Allison et al. |
| 6,418,556 | B1 | 7/2002 | Bennington et al. |

FOREIGN PATENT DOCUMENTS

| | | |
|---|---|---|
| WO | WO 96/34491 | 10/1996 |
| WO | WO 96/41478 A | 12/1996 |
| WO | WO 97/13368 A | 4/1997 |
| WO | WO 98/37694 | 8/1998 |

OTHER PUBLICATIONS

Video tape of VideoGuide product demonstration, VideoGuide Model VG-1701, VideoGuide, Inc., 1995, 6 minutes.

"Prevue Interactive—Reference Guide DCT 1000—Version 1.2," Prevue Networks, 1996.

"Prevue Interactive—Installer's Guide—DCT 1000," Prevue Networks, Inc., 1996.

"Getting Started With Prevue Interactive—The On-Screen Program Guide for DCT 1000," Prevue Interactive, Feb. 1997.

"Microsoft Windows 3.0 User's Guide," Microsoft Corp., 1985-1990, pp. 1-41.

Declaration of Donald W. Allison dated Feb. 9, 2000.

Digeo's Responses to Plaintiff's First Set of Interrogatories dated Apr. 2, 2007; United States District Court, Central District of California; *Gemstar-TV Guide International, Inc et al.* v. *Digeo, Inc. et al.*; Case No. CV06-6519-DSF (AJWx).

Memorandum of Points and Authorities in Support of Defendant Digeo, Inc.'s Motion for Summary Judgment of Noninfringement of U.S. Patent No. 6,262,722 filed Mar. 24, 2008; United States District Court, Central District of California; *Gemstar-TV Guide International, Inc et al.* v. *Digeo, Inc. et al.*; Case No. CV06-6519-DSF (AJWx).

Separate Statement of Uncontroverted Faces and Conclusions of Law in Support of Defendant Digeo, Inc.'s Motion for Summary Judgement of Noninfringement of U.S. Patent No. 6,262,722; United States District Court, Central District of California; *Gemstar-TV Guide International, Inc et al.* v. *Digeo, Inc. et al.*; Case No. CV06-6519-DSF (AJWx).

Plaintiff's Supplemental Response to Digeo, Inc.'s Interrogatory No. 9 dated Feb. 8, 2008; United States District Court, Central District of California; *Gemstar-TV Guide International, Inc et al.* v. *Digeo, Inc. et al.*; Case No. CV06-6519-DSF (AJWx).

Condensed Transcript to the Deposition of Steven Williamson Taken on Jan. 4, 2008; United States District Court, Central District of California; *Gemstar-TV Guide International, Inc et al.* v. *Digeo, Inc. et al.*; Case No. CV06-6519-DSF (AJWx).

Condensed Transcript to the Deposition of Walter Herrington Taken on Jan. 7, 2008; United States District Court, Central District of California; *Gemstar-TV Guide International, Inc et al.* v. *Digeo, Inc. et al.*; Case No. CV06-6519-DSF (AJWx).

Condensed Transcript to the Deposition of Donald Allison Taken on Jan. 9, 2008; United States District Court, Central District of California; *Gemstar-TV Guide International, Inc et al.* v. *Digeo, Inc. et al.*; Case No. CV06-6519-DSF (AJWx).

\* cited by examiner

|  | 78 |  |  |
|---|---|---|---|
| LOGO 82 | WHAT'S ON | | LOGO 82 |

| APRIL 7 | 9:00 AM | 9:30 AM | 10:00 AM |
|---|---|---|---|
| 46 REQ2 | EDDIE (COMEDY) PG-13 | | ▷ |
| 52 AP | ◁ ANIMALS A-Z | PET CONNECTION | ANIMALS AT LARGE ▷ |
| 53 TOON | TAZ-MANIA | SUPER ADVENTURE | SPEED RACER |
| 54 PLEX | NOT AVAILABLE | RANGE RIDER | REBEL |
| 12:30 PM | TO TUNE TO THIS CHANNEL PRESS SELECT FOR PROGRAM INFORMATION PRESS INFO | | |

*FIG. 6*

INTERACTIVE PROGRAM GUIDE NAVIGATOR MENU SYSTEM

This application is a continuation of U.S. patent application Ser. No. 09/573,482 filed May 16, 2000 now abandoned, which is a continuation of U.S. patent application Ser. No. 08/889,526 filed Jul. 8, 1997 (now U.S. Pat. No. 6,262,722), which are hereby incorporated herein in their entireties.

BACKGROUND OF THE INVENTION

This invention relates to video systems, and more particularly, to navigation in interactive television program guide systems.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides allow users to access television program listings in different display formats. For example, a user may desire to view a grid of program listings organized in a channel-ordered list. Alternatively, the user may desire to view program listings organized by time, by theme (movies, sports, etc.), or by title (i.e., alphabetically ordered). Other program guide options allow the user to set favorite channels, program a videocassette recorder, set an automatic timed reminder, or order pay-per-view movies. Numerous other program guide options are generally available in a typical interactive program guide.

Program guide options are presented to the user through a series of linked menus. The user makes menu selections by pressing an "enter" or "select" button on a remote control. However, because so many program guide options are typically available, interactive program guide menu structures have many nested layers and are quite complex. As a result, the user may have difficulty navigating through the menu structure of the guide without becoming confused.

It is therefore an object of the present invention to provide an interactive television program guide with an improved logical structure that facilitates navigation through the guide.

SUMMARY OF THE INVENTION

This and other objects of the invention are accomplished in accordance with the principles of the present invention by providing an interactive program guide system in which a logically flat navigator structure is used to provide access to program guide options. The navigator structure has a number of selectable program guide categories, each of which corresponds to a fairly broad range of program guide services. For example, one program guide category might relate to television program guide listings and another program guide category might relate to digital services. Because the program guide categories are broad, all of the available features of an interactive television program guide may be organized using only a few (e.g., five to ten) such program guide categories. Each program guide category has associated program guide options. For example, the program guide category "television program guide" might have selectable program guide options for "by time," "by channel," or "themes," television program listings display options.

Only some of the available program guide categories are typically displayed at a single time to avoid visually cluttering the display screen. For example, three program guide categories may be displayed in a straight line across the top of the user's display screen. Similarly, there is a limit to the number of selectable program guide options that are typically displayed at a time. Although a given program guide category may have ten associated selectable program guide options, only six of those selectable program guide options are preferably displayed at the same time.

To avoid visual clutter, the system preferably displays only the selectable program guide options associated with a single centrally-displayed program guide category. The program guide options are arranged directly beneath the central program guide category in a horizontally-centered straight line that is perpendicular to the line of program guide categories.

Navigation may be controlled using a remote control with a pair of vertical cursors and a pair of horizontal cursors. A highlight region defines the user's current location within the selectable program guide options. Pressing a vertical cursor key moves the highlight region within the program guide options (e.g., by scrolling or paging the program guide options). Pressing a horizontal cursor key causes a new set of program guide options and a new associated program guide category to be displayed in the horizontally central position of the screen. Program guide categories and their associated selectable program guide options may be organized in the form of a logically continuous horizontally-linked loop, so that the user can shift continuously through all of the program guide categories and selectable program guide options with the horizontal cursor keys.

If desired, additional columns of selectable program guide options may be displayed adjacent to the single column of selectable program guide options displayed under the central program guide category. To avoid visual clutter and to focus the attention of the user on the currently available program guide options, the additional columns of selectable program guide options are preferably displayed with a diminished visibility relative to the centrally displayed program guide options.

Further features of the invention, its nature and various advantages will be more apparent from the accompanying drawings and the following detailed description of the preferred embodiments.

BRIEF DESCRIPTION OF THE DRAWINGS

FIG. 6 is an illustrative program listings display screen in accordance with the present invention.

DETAILED DESCRIPTION OF THE PREFERRED EMBODIMENTS

Figure 1:
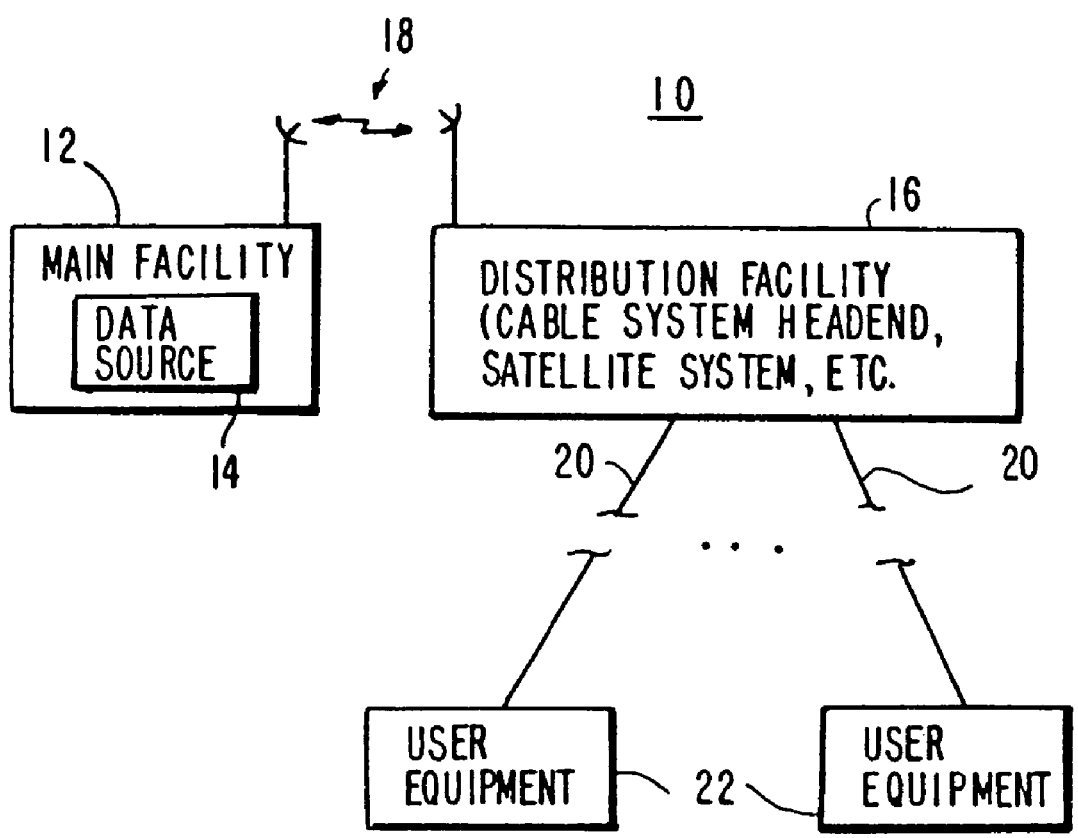
FIG. 1 is a schematic block diagram of a system in accordance with the present invention.

An illustrative system 10 for an interactive television program guide in accordance with the present invention is shown in FIG. 1. Main facility 12 provides data from data source 14 to distribution facility 16 via communications link 18. Link 18 may be a satellite link, a telephone network link, a cable or fiber optic link, a microwave link, a combination such links, or any other suitable communications path. If it is desired to transmit video signals over link 18 in addition to data signals, a relatively high bandwidth link such as a satellite link may generally be preferred to a relatively low bandwidth link such as a telephone line. Distribution facility 16 may be a cable system headend, a broadcast distribution facility, or a satellite television distribution facility, and may have Internet access capabilities if desired.

The data transmitted by main facility 12 to distribution facility 16 includes television program listings data (e.g., program times, channels, titles, and descriptions) and data for additional services other than television program listings. If desired, some data may be provided using data sources at facilities other than main facility 12.

Distribution facility 16 distributes the television program listings data and the data for other services to multiple users via communications paths 20. Each user has user equipment 22 for displaying the television program listings and information for the other services using an interactive television program guide. Many features of the interactive television program guide are provided by executing instructions with a microprocessor or similar control circuitry within user equipment 22. Communication paths 20 preferably have sufficient bandwidth to allow distribution facility 16 to distribute television programming and other video information to user equipment 22. Television programming and video information may also be distributed by distribution facility 16 over communications paths separate from communications paths 20.

Certain program guide functions may require user equipment 22 to transmit data to distribution facility 16 over communications paths 20 (e.g., with a cable modem, telephone modem, or other suitable return link). If desired, return data may be transmitted over separate communications paths (not shown).

Figure 2:
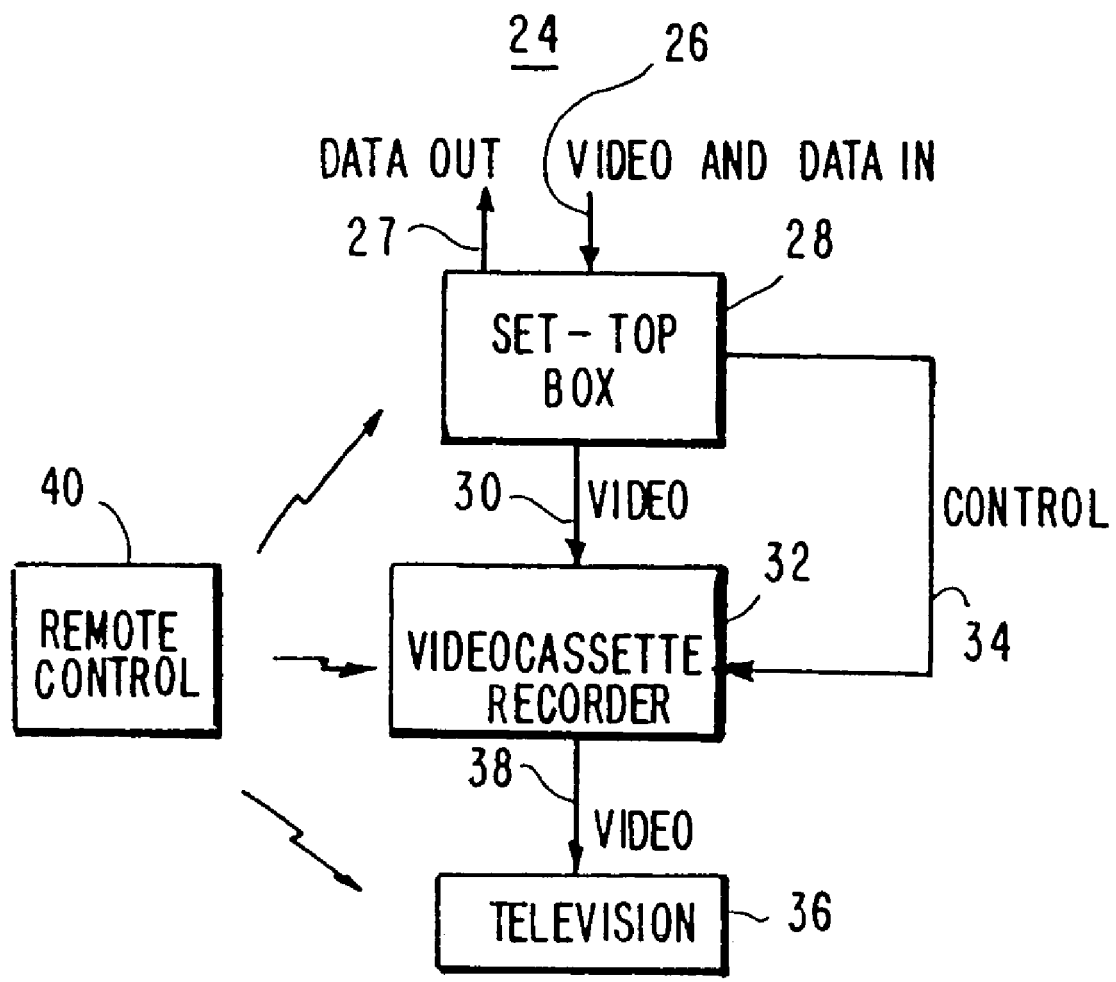
FIG. 2 is a schematic block diagram of illustrative user equipment in accordance with the present invention.

An illustrative arrangement for user equipment 22 is shown in FIG. 2. Television equipment 24 of FIG. 2 receives video and data from television distribution facility 16 (FIG. 1) at input 26. Information from the user (e.g., Internet browsing commands, pay-per-view ordering information, commands for requesting various digital services, etc.) may be transmitted to distribution facility 16 via output 27. During normal television viewing, the user tunes set-top box 28 to a desired television channel. The signal for that television channel is then provided at video output 30 either as a radio-frequency (RF) signal on a predefined channel (e.g., channel 3 or 4) or as a demodulated video signal. The video signal at output 30 is received by videocassette recorder 32, so that the user may record programs. Program recording and other features may be controlled by set-top box 28 using control path 34. A typical control path 34 involves the use of an infrared transmitter coupled to the infrared receiver in videocassette recorder 32 that normally accepts commands from a remote control such as remote control 40. Remote control 40 may be used to control set-top box 28, videocassette recorder 32, and television 36.

Television 36 receives RF or demodulated video signals from videocassette recorder 32 via communications path 38. The video signals on communications path 38 may either be generated by videocassette recorder 32 when playing back a prerecorded videocassette or may by passed through from set-top box 28. During normal television viewing, the viewer tunes to a desired television channel with set-top box 28 and the corresponding video signals are provided to television 36. When the user wishes to view interactive television program guide information, the user may press a "menu" button on remote control 40. When set-top box 28 receives commands from remote control 40 that inform set-top box 28 that the menu button has been pressed, processing circuitry within set-top box 28 displays a program guide navigator menu in accordance with the present invention on television 36.

Figure 3:
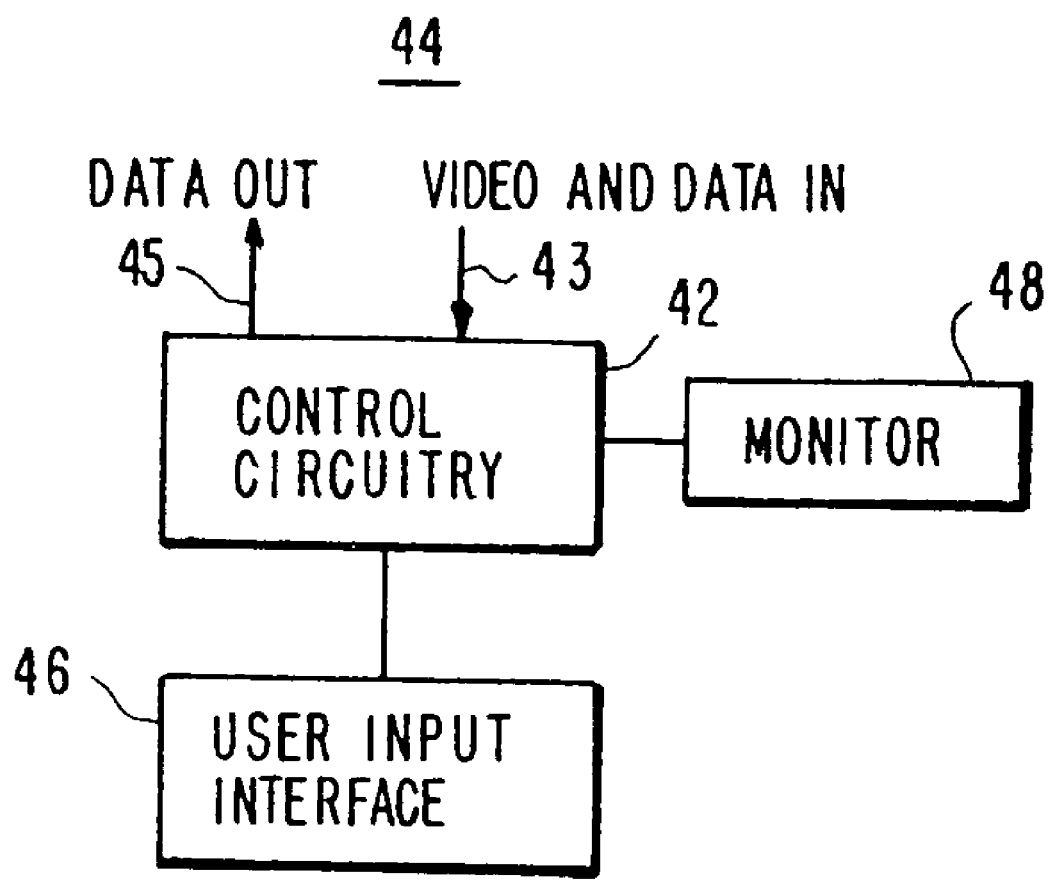
FIG. 3 is a generalized schematic block diagram of portions of the illustrative user equipment of FIG. 2.

A more generalized embodiment of user equipment 24 (FIG. 2) is shown in FIG. 3. As shown in FIG. 3, video and data from distribution facility 16 (FIG. 1) is received by control circuitry 42 of user equipment 44 at input 43. Video signals are typically provided on multiple television channels. Data may be provided on a television channel sideband, in the vertical blanking interval of a television channel, or by any other suitable data transmission technique. If desired, information from the user may be transmitted to distribution facility 16 using output 45. Transmissions to distribution facility 16 may be made using a cable modem, a telephone modem, or any other suitable transmission arrangement.

The user controls the operation of user equipment 44 with user input interface 46. User input interface 46 may be a pointing device, wireless remote control, keyboard, touch pad, voice recognition system, or any other suitable user input device. To watch television, the user instructs control circuitry 42 to display a desired television channel on monitor 48. To use the interactive program guide, the user instructs control circuitry 42 to display program guide information on monitor 48.

The functions of control circuitry 42 may be provided using the set-top box arrangement of FIG. 2. Alternatively, these functions may be integrated into a personal computer (PC), personal computer and television (PC/TV), television, or videocassette recorder. If desired, a combination of such hardware may be used.

When a user invokes the interactive program guide (e.g., by entering a command with user input interface 46), control circuitry 42 initially generates a navigator menu. Some of the information used to generate the navigator menu and provide associated guide functions is semi-permanently stored in control circuitry 42. Other information for the navigator menu may be contained in data periodically provided to control circuitry 42 from data source 14 (FIG. 1) in main facility 12 (FIG. 1). This information is preferably also stored in control circuitry 42, so that control circuitry 42 can provide most program guide features without waiting to download further information from distribution facility 16. Other program guide features (e.g., Internet access) may use information that is downloaded in real time.

Figure 4:
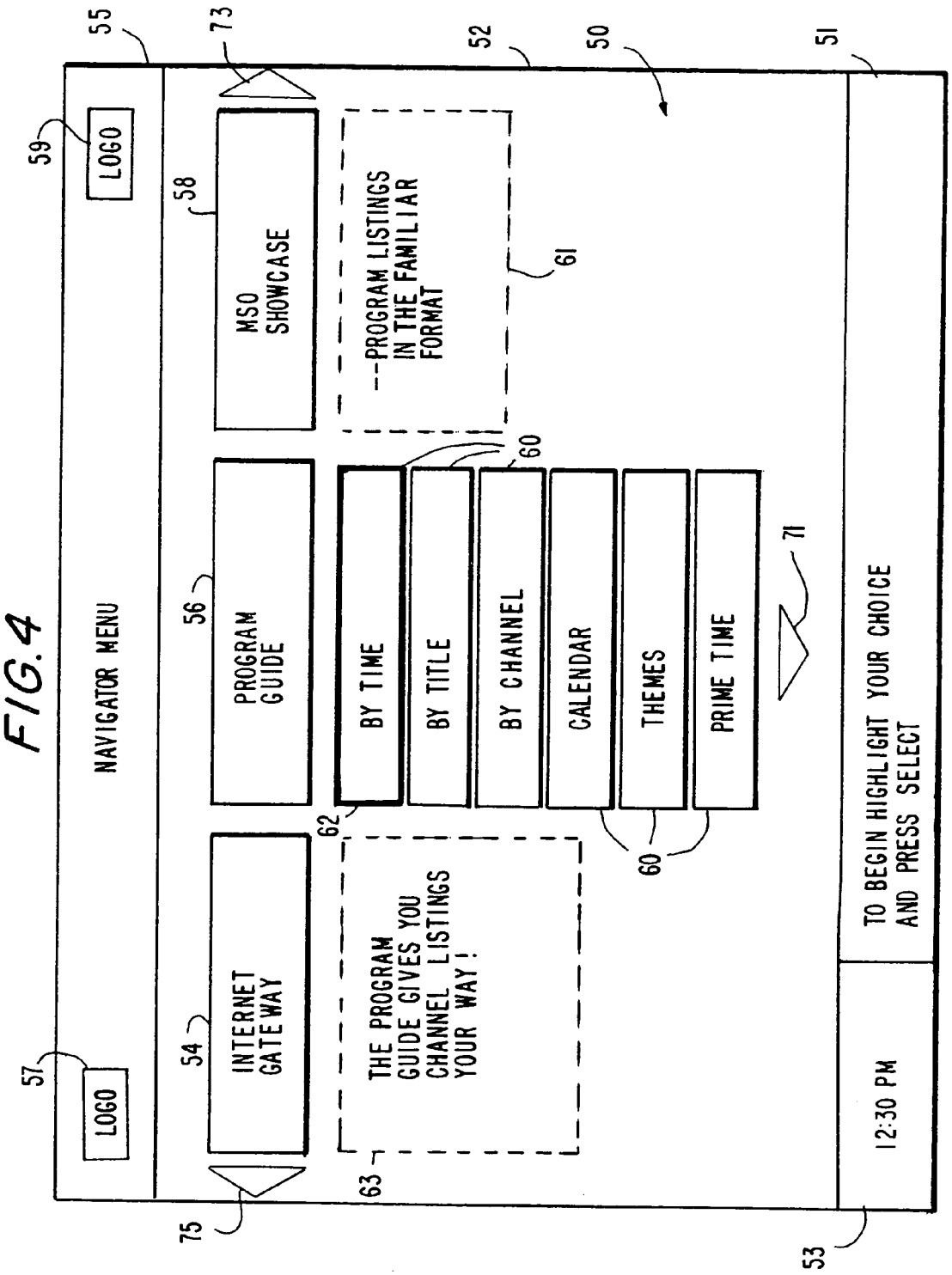
FIG. 4 is an illustrative program guide navigator display screen in accordance with the present invention.

An illustrative navigator menu 50 is shown in FIG. 4. Navigator menu 50, which is displayed on display screen 52, contains program guide categories 54, 56, and 58. A number of selectable program guide options are associated with each program guide category. For example, selectable program guide options 60 are associated with program guide category 56. In order to avoid visually cluttering display screen 52, only a few (e.g., three) program guide categories are preferably shown at the same time. Additional program guide categories may be accessed by repositioning program guide categories 54, 56, and 58. Visual clutter may also be avoided by displaying a single column of selectable program guide options (i.e., selectable program guide options 60 associated with program guide category 56). This arrangement allows helpful text messages to be displayed in regions 61 and 63.

Text messages may also be displayed in information region 51. The current time may be displayed in time region 53. Title bar 55 may be used to display an informative title, such as "Navigator Menu." Logo regions 57 and 59 may be used to display logos identifying the program guide service provider and cable system operator.

Program guide categories 52, 56, and 58 are associated with fairly broad groups of program guide features. For example, program guide category 54 is associated with Internet services. Program guide category 56 is associated with television program listings. Program guide category 58 is associated with promotional information for the user's cable system operator (sometimes called a multiple system operator or MSO). Selectable program guide options 60 are associated with more specific program guide features. The selectable program guide options displayed below a given program guide category belong to that program guide category.

Because program guide categories such as program guide categories 54, 56, and 58 are associated with broad groups of program guide features, it is possible to organize the program guide features of a fairly complex interactive program guide using relatively few such program guide categories. The number of selectable program guide options that are associated with a given program guide category depends on the number and type of program guide options used in the system, but is typically about five to ten selectable program guide options per category. The structure of navigator menu 50 allows a user to reach a given selectable program guide with a relatively small number of keystrokes and without navigating through numerous nested menu layers.

A highlight region such as highlight region 62 is used to define the current position of the user in the selectable program guide options of navigator menu 50. Information related to the currently highlighted selectable program guide option may be displayed in region 61. Information related to the program guide category associated with the currently highlighted selectable program guide option may be displayed in region 63.

The user positions highlight region 62 by entering suitable commands with user input interface 46 (FIG. 3). An illustrative user input interface 46 is remote control 64 of FIG. 5. Depressing menu button 66 invokes the program guide and causes control circuitry 42 (FIG. 3) to display navigator menu 50 on monitor 48 (FIG. 3). If highlight region 62 is positioned on a selectable program guide option, pressing menu button 66 causes control circuitry 42 to exit the program guide. If the user has selected a given selectable program guide option and is presently using an associated program guide feature (e.g., by filling out a pay-per-view order screen or by setting up favorite channels, etc.), pressing menu button 66 preferably returns highlight region 62 to the given program guide potion.

Up key 68 and down key 70 are vertical cursor keys that are used to move highlight 62 up or down within program guide options. For example, if "by title" selectable program guide option 60 of FIG. 4 is highlighted, keys 68 and 70 may be used to move to "by time" selectable program guide option 60 or "by channel" selectable program guide option 60. Selectable program guide options 60 may be scrolled if there are more selectable program guide options 60 than will conveniently fit on display screen 52 at one time. Alternatively, additional pages of selectable program guide options may be displayed whenever the user moves highlight region 62 past the first or last displayed program guide option. The presence of additional selectable program guide options 60 in the column of selectable program guide options 60 shown in FIG. 4 is indicated by arrow 71.

Left key 72 and right key 74 are horizontal cursor keys that are used to shift new selectable program guide options and program guide categories into the central, column position in place of a previously displayed program guide category and associated options. For example, if one of the program guide selectable program guide options 60 of FIG. 4 is highlighted, key 72 may be used to shift program guide category 58 and the selectable program guide options associated with program guide category 58 into the central column of display screen 52. Key 74 maybe used to shift program guide category 54 and the selectable program guide options associated with program guide category 54 into the central column of display screen 52.

Select button 76 allows the user to select a given selectable program option. For example, if highlight 62 is on "by time" selectable program guide option 60 as shown in FIG. 4, pressing select button 76 (FIG. 5) causes control circuitry 42 (FIG. 3) to display a time-ordered grid of television program listings on monitor 48 (FIG. 3) based on the television listings data provided by distribution facility 16 (FIG. 1).

An illustrative program grid 78 is shown in FIG. 6. Rows of grid 78 contain program listings. Each row contains information for a different television channel. Columns of grid 78 are associated with different scheduled broadcast times for the programs (e.g., 9:00 AM, 9:30 AM, and 10:00 AM). Program grid 78 has title bar 80, which may be used to identify the current display format of the program guide (e.g., with a text label such as "what's on"). Logos 82 may be contained within title bar 80. One logo may identify the provider of the interactive television program guide and the other logo may identify the MSO of the distribution facility 16. Instructions related to the user of the program guide may be shown in information region 84. The current time may be displayed in time region 86.

Program grid 78 preferably has highlight region 88. Pressing select button 76 (FIG. 5) when highlight region 88 is on a given television program in grid 78 may cause control circuitry 42 (FIG. 3) to tune to the television channel for the selected program. Information for a highlighted program may be obtained by pressing info button 90 (FIG. 5) while highlight region 88 is on the television program listing for which more information is desired.

Remote control 64 (FIG. 5) also has channel number buttons 92, channel up button 94, and channel down button 96 for selecting television channels. Power button 98 and additional buttons 100 may be provided to support additional program guide and user equipment control features.

Selecting a program guide option from navigator menu 50 of FIG. 4 may result in the immediate execution of an associated program guide function. For example, when select button 76 (FIG. 5) is pressed while highlight 62 (FIG. 4) is on "by time" selectable program guide option 60 (FIG. 4.), program grid 78 (FIG. 6) is displayed without need for further user intervention. However, selecting other program guide options (such as "by themes" selectable program guide option 60 (FIG. 4) may result in additional options being presented to the user (e.g., an option allowing the user to select a desired theme.)

Figure 7:
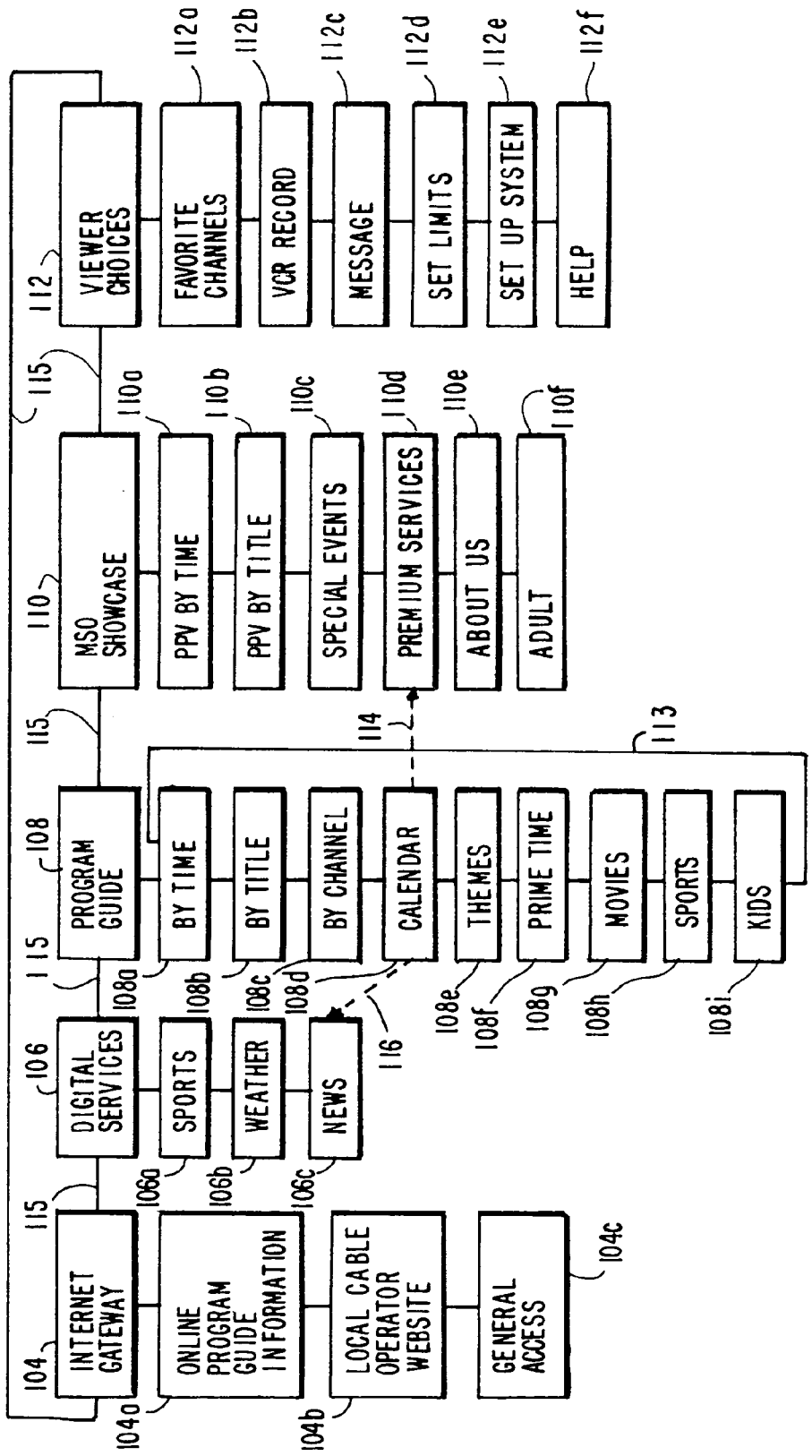
FIG. 7 is a schematic block diagram showing an illustrative logical arrangement for program guide categories and associated selectable program guide options in accordance with the present invention.

The logical structure of an illustrative embodiment of the program guide navigator menu structure of the present invention is shown in the schematic diagram of FIG. 7. Program guide navigator menu structure 102 has program guide categories 104, 106, 108, 110, and 112. Each program guide category has an associated group of selectable program guide options in that category of service.

Program guide category 104 (Internet Gateway) is related to services in the Internet category. For example, selectable program guide option 104a relates to online program guide information. When a user selects program guide option 104a, control circuitry 42 connects the user to a web site containing program guide services via Internet access equipment at distribution facility 16. In making such a connection, data from control circuitry 42 is transmitted to distribution facility 16 via output 45. Data from distribution facility 16 is provided to control circuitry 42 via input 43. When the user selects program guide option 104b, the user is presented with a local cable operator's web site. General Internet access is provided by selecting program guide option 104c.

Program guide category 106 (Digital Services) is related to digital information services. Selectable program guide options 106a, 106b, and 106c are associated with program guide category 106. Selectable program guide option 106a relates to sports information. When the user selects program guide option 106a, control circuitry 42 (FIG. 3) presents sports-related information on monitor 48. Sports information may include scores, game highlights, etc. When the user selects program guide option 106b, weather information such as current local weather, forecasts, etc. is provided. Selecting program guide option 106c provides access to news information. The data required to provide the content for selectable program guide options 106a, 106b, and 106c is preferably downloaded to control circuitry 42 (FIG. 3) from distribution facility 16 (FIG. 1). The data may be stored in control circuitry 42 and periodically updated. If desired, such data may also be provided in real time. Real time data is accessed by sending requests to distribution facility 16 via output 45 (FIG. 3). Distribution facility 16 provides the requested data to user equipment 44 (FIG. 3) in real time via input 43 (FIG. 3).

Program guide category 108 (Program Guide) is related to television program guide listings.

Selecting program guide option 108a causes control circuitry 42 (FIG. 3) to display a grid of television program listings on monitor 48 (FIG. 3) that are organized by channel, as shown in FIG. 6.

Program guide option 108b allows program listings information to be displayed in an alphanumerically-ordered list selectable program guide option 108b preferably allows the user to enter the first several letters of a desired title. Vertical cursor keys 68 and 70 (FIG. 5) can be used to toggle between letters. Select key 76 can be used to select a desired letter. Horizontal cursor keys 72 and 74 (FIG. 5) can be used to move between letter positions.

Program guide option 108c allows program listings to be organized by channel. For example, a program list may be displayed that contains 24 hours of programming for channel 2, followed by 24 hours of programming for channel 3, followed by 24 hours of programming for channel 4, etc. Within each 24 hours of listed programming for a given channel, program listings may be organized chronologically.

Program guide option 108d provides a calendar option. The user can view program listings information for several days in advance. Selecting program guide option 108d presents the user with a calendar from which the user can select a given date and time of interest. Once the user has selected a desired date and time from the calendar, a program grid such as program grid 78 of FIG. 6 may be displayed containing program listings information for that date and time.

Program guide option 108e relates to theme selection. Once selectable program guide option 108e is selected, the user may select a desired theme (e.g., movies, sports, children, news, comedy, or soaps) from a list. The program listings for the selected theme may be displayed in any suitable format, such as a channel-ordered, time-ordered, or theme-ordered (genre-ordered) list. If desired, the choice of which display format is to be used may be left to the user.

Program guide option 108f allows the program guide to display a program listings grid for prime time television programs.

Program guide options 108g, 108h, and 108i allow program guide listings to be displayed for the genres of "movies," "sports," and "kids." Such program listings can be displayed in the same format used to display program listings information following theme selection under selectable program guide option 108e.

Figure 5:
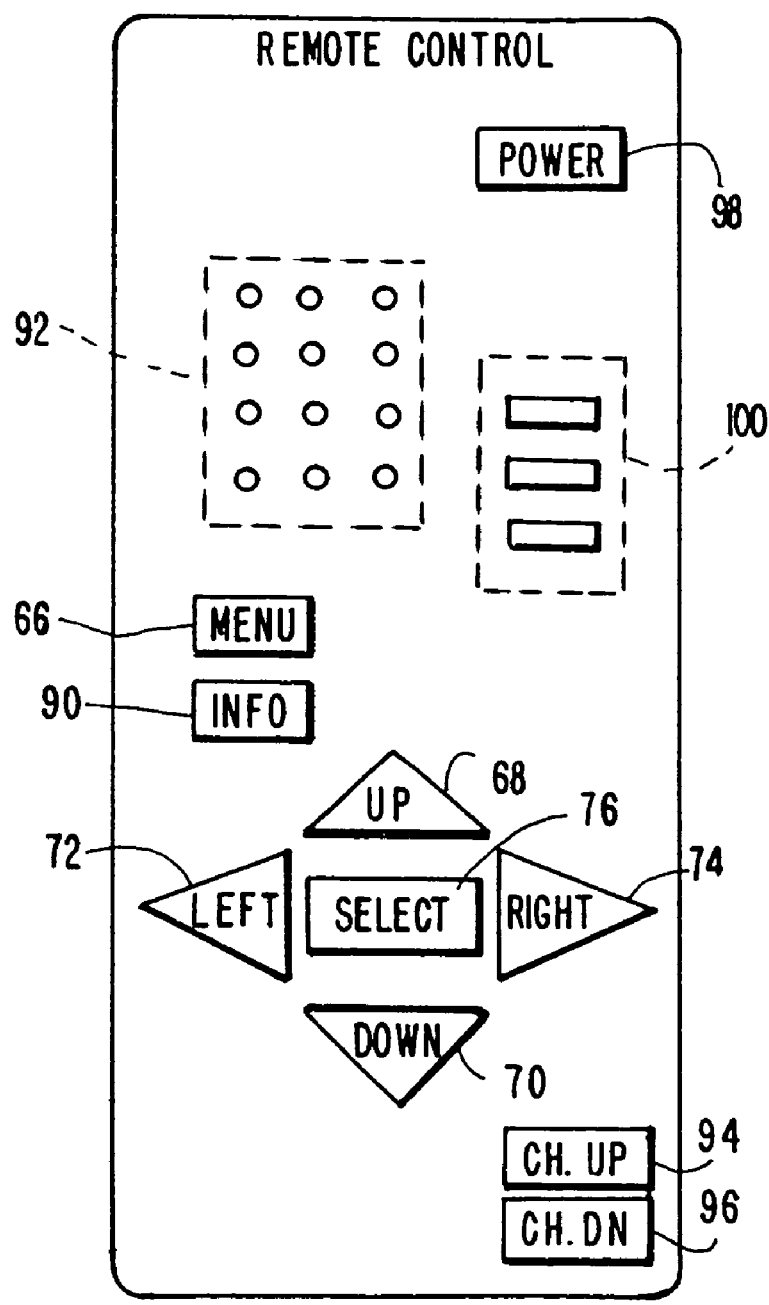
FIG. 5 is an illustrative remote control in accordance with the present invention.

Because there are nine selectable program guide options 108a-i, whereas only six selectable program guide options are preferably displayed at a time, accessing all nine of selectable program guide options 108a-i involves the scrolling or paging of program guide option. For example, selectable program guide options 108a-f may initially be displayed in a column below program guide category 108. Highlight region 62 (FIG. 4) is initially positioned on selectable program guide option 108a when navigator menu 50 is invoked by pressing menu key 66 (FIG. 5).

Program guide options 108a-i are preferably organized in a logically continuous vertically-linked loop, so that the user can scroll or page through the displayed selectable program guide options using vertical cursor keys 68 and 70. Line 113 illustrates how a user can cause selectable program guide option 108a to be displayed after selectable program guide option 108h has been displayed by further use of down cursor key 70. Manipulation of vertical keys 68 and 70 preferably does not move highlight region 62 beyond the list of program guide options.

Program guide categories 104, 106, 108, 110, and 112 and their associated selectable program guide options form a logically continuous horizontally-linked loop, as shown by logical flow lines 115. Lines 114 and 116 illustrate the logical flow in program guide navigator menu structure 102 when a user presses a horizontal cursor key while an illustrative selectable program guide option (i.e., selectable program guide option 108d) is highlighted. Pressing right cursor key 74 (FIG. 5) preferably causes selectable program guide options 110a-f to be displayed in the central column of display screen 52 in place of selectable program guide options 108a-i and causes highlight region 62 (FIG. 4) to move from selectable program guide option 108d to selectable program guide option 110d. The vertical position of selectable program guide option 110d is the same as the previous vertical position of selectable program guide option 108d, so that the vertical position of highlight region 62 does not change. Pressing left cursor key 72 (FIG. 5) preferably causes selectable program guide options 106a-c to be displayed in the central column of display screen 52 in place of selectable program guide options 108a-i and causes highlight region 62 (FIG. 4) to move from selectable program guide option 108d to selectable program guide option 106c. Although the vertical position of selectable program guide option 106c is not identical to the previous vertical position of selectable program guide option 108d, the vertical position of selectable program guide option 106c is as close as possible to that of selectable program guide option 108d.

If desired, highlight region 62 can be moved to the top selectable program guide option position (e.g., 106a or 110a)

whenever a new program guide category and its associated selectable program guide options are moved into the horizontally central position using a horizontal cursor key.

Program guide category 110 (MSO Showcase) is related to services of the type offered by a multiple system operator (MSO) or cable system operator Selectable program guide options 110a-f are associated with program guide category 110. When a user selects program guide option 110a, upcoming pay-per-view events are displayed in a time-ordered list. When a user selects program guide option 110b, upcoming pay-per-view events are displayed in a title-ordered list. When selectable program guide option 110c is selected, information on special pay-per-view events such as boxing events and other one-time events is displayed. Information on premium television services such as premium movie channels is provided at selectable program guide option 110d. Selectable program guide option 110e allows the user to access information about the MSO, such as who to call for technical assistance or information about service options. Selectable program guide option 110f contains information on adult services. In addition to presenting information on service options, selectable program guide options 110a-d and 110f may provide the user with information such as a telephone number to call or an order screen to fill out so that the user can order pay-per-view events, special events, premium channels, and adult services.

Program guide category 112 (Viewer Choices) is related to viewer-selectable options. Selectable program guide options 112a-f are associated with program guide category 112. When a user selects program guide option 112a, the user is allowed to set up a list of favorite channels. Selectable program guide option 112b allows the user to select programs to be recorded by a videocassette recorder such as videocassette recorder 32 (FIG. 2). Selectable program guide option 112c relates to messages sent from the cable system operator at distribution facility 16 (FIG. 1) to customers. For example, a message could contain information on a special offer for an upcoming pay-per-view event. Selectable program guide option 112d allows the user to set limits, such as a monthly spending limit for a family's pay-per-view account. Selecting program guide option 112e allows the user to set configurable options for user equipment 44 (FIG. 3). Program guide option 112f provides the user with helpful information relating to viewer choices.

Figure 8:
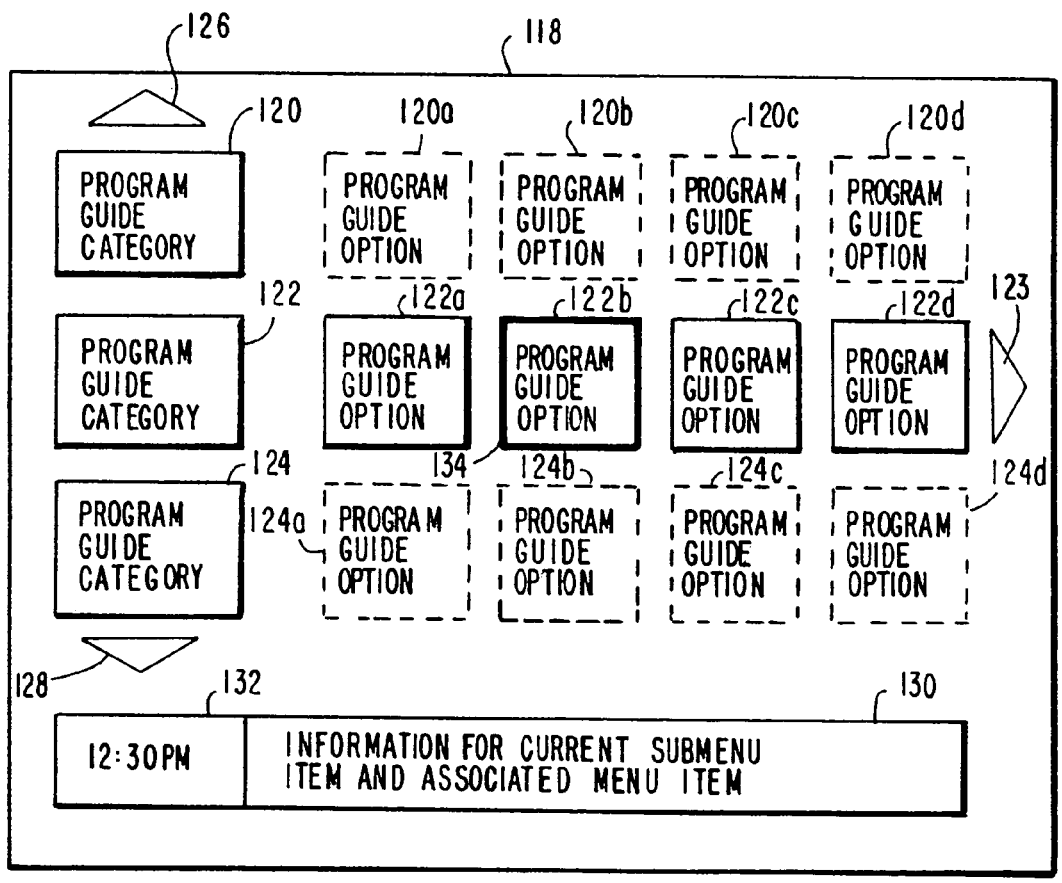
FIG. 8 is a further illustrative program guide navigator display screen in accordance with the present invention.

If desired, program guide categories can be displayed in a vertical column instead of a horizontal row. This type of arrangement is shown in FIG. 8. On display screen 118, program guide categories 120, 122, and 124 are arranged in a column. Although it is possible to fit more program guide categories onto display screen 118, only approximately three program guide categories are preferably displayed at a time to avoid visually cluttering the display. The availability of additional program guide categories and associated selectable program guide options is indicated by arrows 126 and 128. Selectable program guide options 120a, 120b, 120c, and 120d are associated with program guide category 120. Selectable program guide options 122a, 122b, 122c, and 122d are associated with program guide category 122. Selectable program guide options 124a, 124b, 124c, and 124d are associated with program guide category 124. The availability of additional selectable program guide options 122 in the vertically central row of display screen 118 is indicated by arrow 123.

Program guide options 122a-d and associated program guide category 122 are preferably displayed in the vertically center row of display screen 118. Alternatively, these items may be displayed in the top row, the bottom row, or any other desired row if more than three rows are displayed.

Program guide options 120a-d and selectable program guide options 124a-d can be hidden from view, which allows informative messages such as those shown in FIG. 4 to be displayed above and below selectable program guide options 122a-d. Alternatively, as shown FIG. 8, selectable program guide options 120a-d and selectable program guide options 124a-d may be displayed with a diminished visibility relative to selectable program guide options 122a-d. Such a diminished visibility may be accomplished by displaying otherwise colored program guide categories in black and white, by displaying selectable program guide options as though they were not focused, by reducing the image intensity of the selectable program guide options, or by otherwise distorting the display format of selectable program guide options 120a-d and 124a-d. These arrangements reduce visual clutter and focus the attention of the user on the centrally-displayed row of selectable program guide options, while simultaneously providing the user with a strong visual cue regarding the presence of selectable program guide options 120a-d and 124a-d. Because displaying selectable program guide options 120a-d and 124a-d with diminished visibility occupies most of the screen area above and below selectable program guide options 122a-d, an information region 130 may be used to display information for the current selectable program guide option (i.e., highlighted selectable program guide option 122b) and its associated program guide category (i.e., program guide category 122). The current time may be displayed in region 132.

Navigation with the menu structure shown in FIG. 8 is preferably similar to navigation with the menu structure shown in FIG. 4, except that the functions of horizontal cursor keys 72 and 74 and the functions of vertical cursor keys 68 and 70 are reversed. For example, the user can change the horizontal position of highlight region 134 within selectable program guide options 122a-d using horizontal cursor keys 72 and 74. To move a new program guide category and associated selectable program guide options into the vertically central row of display screen 118, the user may press either up key 68 or down key 70.

The foregoing is merely illustrative of the principles of this invention and various modifications can be made by those skilled in the art without departing from the scope and spirit of the invention. For example, any suitable number of program guide categories may be used and any suitable number of program guide categories may be displayed on the screen at one time. Similarly, any suitable number of selectable program guide options may be used and any suitable number of selectable program guide options may be displayed on the screen at one time. In addition, any suitable number of selectable program guide options may be associated with a given program guide category. Various program guide categories and program guide options may be used.

What is claimed is:

1. An interactive program guide system in which television program guide information is provided to a distribution facility, comprising control circuitry configured to:

receive the television program guide information from the distribution facility;

simultaneously display a line of program guide categories and a perpendicular line of selectable program guide options associated with a given one of the displayed program guide categories such that one end of the perpendicular line of selectable program guide options is adjacent to the given one of the displayed program guide categories, wherein the selection of at least one of the selectable program guide options results in a display of program listings; and replace at least some of the displayed program guide categories and selectable program guide options with new program guide categories and selectable program guide options by shifting the new program guide categories and selectable program guide options into position in place of the displayed program guide categories and selectable program guide options.

2. The system defined in claim 1, wherein the control circuitry is further configured to display a highlight region on one of the selectable program guide options.

3. The system defined in claim 2, wherein the control circuitry is further configured to display a new program guide category and associated perpendicular line of program guide options in place of the given program guide category and associated perpendicular line of program guide options in response to commands from a pair of cursors.

4. The system defined in claim 3, wherein the control circuitry is further configured to display the highlight region at the same position within the new perpendicular line as the highlight region was displayed in the perpendicular line associated with the given program guide category.

5. The system defined in claim 2, wherein the control circuitry is further configured to display an informative message for the selectable program guide option on which the highlight region is displayed.

6. The system defined in claim 2, wherein the control circuitry is further configured to position the highlight region among the selectable program guide options in the perpendicular line in response to commands from a pair of cursors.

7. The system defined in claim 2, wherein the control circuitry is further configured to select the selectable program guide option on which the highlight region is displayed in response to commands from a remote control select button.

8. The system defined in claim 1, wherein the control circuitry is further configured to display an additional perpendicular line of selectable program guide options that have a diminished visibility relative to the displayed perpendicular line of selectable program guide options.

9. The system defined in claim 1, wherein the control circuitry is further configured to scroll the program guide options.

10. The system defined in claim 1, wherein the control circuitry is further configured to display the program guide categories in a row.

11. The system defined in claim 1, wherein the control circuitry is further configured to display the selectable program guide options in a central column.

12. A method for providing an interactive program guide in which television program guide information is provided to a distribution facility, comprising the steps of:
receiving the television program guide information from the distribution facility;
simultaneously displaying a line of program guide categories and a perpendicular line of selectable program guide options associated with a given one of the displayed program guide categories such that one end of the perpendicular line of selectable program guide options is adjacent to the given one of the displayed program guide categories, wherein the selection of at least one of the selectable program guide options results in a display of program listings; and
replacing at least some of the displayed program guide categories and selectable program guide options with new program guide categories and selectable program guide options by shifting the new program guide categories and selectable program guide options into position in place of the displayed program guide categories and selectable program guide options.

13. The method defined in claim 12 further comprising the step of displaying a highlight region on one of the selectable program guide options.

14. The method defined in claim 13 further comprising the step of displaying a new program guide category and associated perpendicular line of program guide options in place of the given program guide category and associated perpendicular line of program guide options in response to commands from a pair of cursors.

15. The method defined in claim 14 further comprising the step of displaying the highlight region at the same position within the new perpendicular line as the highlight region was displayed in the perpendicular line associated with the given program guide category.

16. The method defined in claim 13 further comprising the step of displaying an informative message for the selectable program guide option on which the highlight region is displayed.

17. The method defined in claim 13 further comprising the step of positioning the highlight region among the selectable program guide options in the perpendicular line in response to commands from a pair of cursors.

18. The method defined in claim 13 further comprising the step of selecting the selectable program guide option on which the highlight region is displayed in response to commands from a remote control select button.

19. The method defined in claim 12 further comprising the step of displaying an additional perpendicular line of selectable program guide options that have a diminished visibility relative to the displayed perpendicular line of selectable program guide options.

20. The method defined in claim 12 further comprising the step of scrolling the program guide options.

21. The method defined in claim 12 further comprising the step of displaying the program guide categories in a row.

22. The method defined in claim 12 further comprising the step of displaying the selectable program guide options in a central column.

* * * * *